Feb. 12, 1963   F. C. BASELT   3,077,409
COFFEE PACKAGE
Filed July 2, 1958
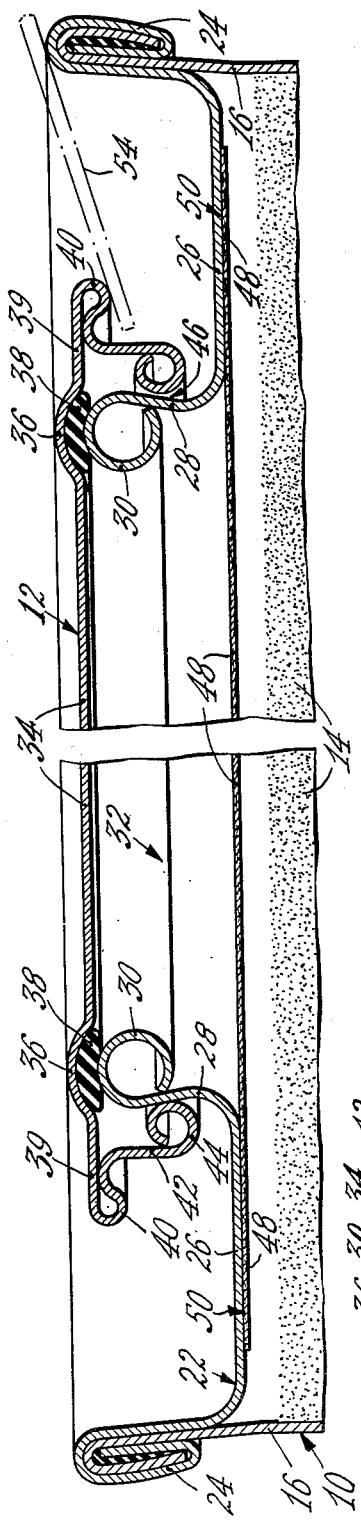
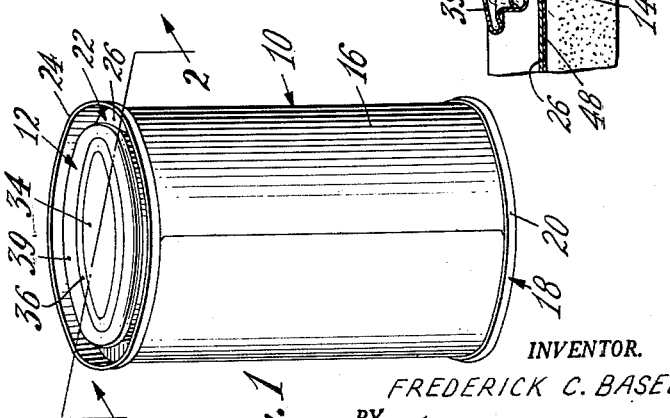
INVENTOR.
FREDERICK C. BASELT
BY
AGENT United States Patent Office 3,077,409
Patented Feb. 12, 1963

3,077,409
COFFEE PACKAGE
Frederick C. Baselt, New York, N.Y., assignor to American Can Company, New York, N.Y., a corporation of New Jersey
Filed July 2, 1958, Ser. No. 746,180
6 Claims. (Cl. 99—152)

The present invention relates to packing coffee, and more particularly to a coffee package utilizing a self-venting reclosure can.

At the present time, freshly ground coffee is widely packaged in key-opening tearing strip cans. In order to prevent deterioration of the coffee through oxidation, the filled can is initially closed under vacuum to exclude air therefrom. However, coffee gives off carbon dioxide for a considerable length of time after roasting and grinding which soon dissipates the vacuum and develops pressure within the sealed can. This carbon dioxide gas is produced during the roasting and released most quickly immediately after grinding, and, in order to prevent the creation of gas pressures within the can which would cause excess bulging of the flat can ends, it has been found necessary to hold the freshly ground and roasted coffee in bins for a suitable period prior to packing into the cans in order to permit this gas to escape. This holding period varies with the type of coffee and the degree of roast, and generally ranges from twenty to ninety minutes, and is very undesirable from the packer's standpoint, since it necessitates the use of large holding bins and requires careful control of the holding cycle.

In order to eliminate this holding period, I have developed a method of packing coffee which utilizes a can embodying a self-venting closure designed to prevent the ingress of outside air as long as there is a vacuum or very little positive pressure within the can, but which vents when a predetermined pressure is reached, thus permitting the excess gas to escape, thereby maintaining a desired pressure within the can. This pressure may range from one-half to six pounds per square inch although the preferred range is from two to four pounds per square inch. The actual pressure at which the venting action takes place depends upon various factors of construction of the can, such as the weight of the plate used and the proportion and dimensions of the can parts.

One of the features of the present invention which contributes importantly to its success is the use of a gas permeable membrane which is positioned between the coffee and the venting closure of the package. This membrane is made of a material which has the property of permitting the gas evolved by the coffee to pass freely through it, but of restraining such passage of the small coffee particles. By reason of its construction, the membrane functions to permit venting of the gases from the unopened container; to shield the venting mechanism from the granular coffee particles; to prevent the ground coffee particles from being ejected from the can when the closure is removed, and to detect unauthorized tampering with the coffee.

Another feature is the provision in such coffee package of a top panel adapted to flex upwardly under the pressure of the internally generated gas, the panel being extended outwardly beyond a ring of sealing compound carried by it so that the sealing compound is spaced away from the fulcrum of the flexing movement of the panel in order that its upward movement be amplified, thereby insuring reliable venting of the gas from the container at low internal pressures.

An object of the instant invention, therefore, is to provide a method of packing coffee wherein the heretofore necessary holding period after roasting and grinding is rendered unnecessary, thereby relieving the packer of an annoying source of trouble and expense.

Another object is the provision of a coffee package which is necessary to carry out the above mentioned method.

Numerous other objects and advantages of the invention will be apparent as it is better understood from the following description, which, taken in connection with the accompanying drawings, discloses a preferred embodiment thereof.

Referring to the drawings:

FIGURE 1 is a perspective view illustrating a coffee package made according to the principles of the instant invention;

FIG. 2 is a vertical section, on a greatly enlarged scale, of the upper portion of the package, taken substantially along the line 2—2 of FIG. 1, parts being broken away, and FIG. 3 is a section similar to FIG. 2 on a reduced scale, taken through the container closure and the adjacent portions of the container body ring member showing the parts in venting position.

As a preferred or exemplary embodiment of the instant invention, the drawings disclose a coffee package comprising a quantity of ground coffee 14 contained in a sheet metal container which includes a body 10, the upper end of which carries a snap-on, pry-off closure member 12 which, in addition to its normal function of providing a hermetic seal, also functions to vent the gases generated by the ground coffee when the pressure within the container exceeds a predetermined limit.

The body 10 comprises a cylindrical body wall 16, the lower end of which is closed by a bottom end member 18 secured thereto in a hermetic end seam 20. The upper end of the body wall 16 carries an annular ring member 22, also secured to the body wall 16 in a hermetic double seam 24. The ring member 22 extends inwardly from the base of the double seam 24 to form a countersunk annular panel 26, which at its inner edge merges into an annular, upward and outwardly inclined cover seating wall 28 which in turn merges into an inwardly turned hollow curl 30 which defines the open mouth 32 of the body 10.

The sheet metal closure member 12 preferably comprises a normally flat top panel 34 which overlies the body mouth 32 and is formed with a shallow, upwardly extending annular bead 36 which carries an annular sealing gasket 38 which seats on the ring curl 30 and is preferably formed of resilient, expansible sealing compound which adheres to the inner concave surface of bead 36. The closure panel 34 includes an extension 39 which projects outwardly beyond the sealing gasket 38 for a considerable distance and terminates in a downwardly and inwardly extending hollow bead 40 which forms a reinforced edge for the closure. The bead 40 merges into a depending vertical annular wall 42 which terminates in an inwardly projecting hollow locking curl 44. The inside diameter of the closure curl 44 is less than the outside diameter of the ring curl 30 and at least the upper portion of the inclined seating wall 28, so that when the closure member 12 is positioned over the mouth of the container and pressed downwardly, the curl 44 snaps over the ring curl 30 and then seats against and rides down along the inclined seating wall 28, thus exerting a downward pull or camming action which maintains the top panel 34 under tension and holds the gasket 38 in tight hermetic sealing engagement against the ring curl 30.

As shown to the right in FIGS. 2 and 3, the contiguous portions of the closure curl 44 and the inclined seating wall 28 are not in continuous contact, but are spaced from each other at some areas to form gaps or channels 46, which are essential, as will be seen, to permit the escape of the vented gas from the container. The extent and number of these channels is not critical, the only requirement being that they be sufficient in area to permit the vented gas to pass to the outside of the container. If desired, these channels 46 may be deliberately created by appropriately identing the container parts in manufacting process. In actual practice, however, this is not necessary, for it has been found that the container parts cannot, in normal manufacturing operations, be formed so accurately that the curl 44 will continuously engage the wall 28. As a result, one or more of the channels 46, sufficient in area to serve the required purpose, are always present in the finished container as an inevitable incident of manufacture, and this fact is taken advantage of in the instant invention.

In order to confine the granular coffee 14 within the container, and yet permit the excess gases which it liberates to escape when the desired pressure within the container is exceeded, a permeable membrane or diaphragm 48 is interposed between the open mouth 32 of the container and the coffee 14.

This membrane is preferably secured in place by having its annular peripheral portion adhesively secured to the underside of the flat, annular panel 26 of the ring member 22 as at 50, and is preferably composed of a loosely woven fibrous material, such as hemp paper, having a natural porosity created by the interstices between its fibres. However, it is obvious that the membrane 48 could also be formed of normally non-porous material, such as metal foil or dense paper or cardboard, which is made permeable to gas by being provided with a plurality of perforations which permit passage of the gas through it but are sufficiently small to enable the membrane to act as a sieve to prevent the coffee 14 from passing through. In addition to its function of confining the product, the membrane 48 also serves as a tamperproof seal to prevent substitution of an inferior product for the originally packed coffee 14.

In carrying out the instant method, the coffee is roasted and then ground, and is then immediately filled into the can, thus omitting the conventional holding cycle. The filled can is then closed under vacuum, and may then be exposed to the air, which is prevented from entering by the seal which the gasket 38 makes against the ring curl 30. As stated, the freshly roasted and ground coffee almost immediately starts giving off carbon dioxide which in a relatively short time dissipates the vacuum within the can and then begins to exert pressure against all internal surfaces of the container, the permeability of the membrane 48 permitting the gas to reach the undersurface of the flat closure panel 34. This pressure soon causes the flat closure panel to bulge or flex upwardly and to take an upwardly convex shape extending from its outer edge, which acts as the fulcrum for such movement, to its center.

As the panel bulges, the gasket 38 is moved upwardly relative to the ring curl 30. Since the gasket is resilient and is normally held against the curl 30 under compression, the gasket expands during the initial stages of this movement and remains in contact with the curl 30, thus maintaining a seal. However, when a predetermined pressure within the container is reached, the upward movement of the gasket exceeds its expansion, and a space or channel 52 (see FIG. 3) is created between the gasket 38 and the curl 30, thus permitting a portion of the gas within the container to pass.

Because the closure panel extension 39 projects beyond the gasket 38, the bulging of the panel 34 results in a considerably greater upward movement of the gasket 38 for a given increase in pressure within the container than would result if the panel extension 39 were not present. As a result, a reliable venting action is made possible at considerably lower internal pressures.

After passing through the channel 52, the vented gas flows through the channels 46 and reaches the outside atmosphere. The path of the gas is indicated by the flow lines contained in FIG. 3. As the gas escapes, the pressure within the container is reduced, and the cover panel begins to lose its bulge and reassume its normal position. This eventually results in the reseating of the gasket 38 on the ring curl 30, at which time the venting action ceases until such time as the internal pressure again builds up to raise the gasket 38 from the curl. Under some circumstances, as where gas is evolved quickly, this venting action will be almost continuous, while in other instances it will be more or less intermittent.

It will be noted that the membrane 48 also serves as a shield for the venting mechanism, as the ground coffee could, under certain circumstances, enter and become lodged in the channel 52 and thus prevent the complete reseating of the gasket 38 on the curl 30.

The closure 12 may be easily removed bodily by the ultimate consumer by means of a pry-off instrument 54 such as a coin, spoon handle, etc. which is fulcrumed on the upper end seam 24 with its front edge beneath the reinforcing bead 40, which bead prevents distortion of the outer edge of the closure during the pry-off operation. At the time of the initial removal of the closure, the gas within the container expands suddenly as the pressure is released, and surges outwardly through the mouth 32 of the container until the pressure within the container becomes equalized with the external pressure. This outrushing gas passes easily through the permeable membrane 48 without rupturing it. However, the light coffee particles cannot pass through the membrane, and thus are not carried or projected through the mouth of the container by the gas, as they would be were there no membrane present.

To reach the coffee 14, the consumer must rupture and remove the membrane 48 which thus also serves as a tamperproof seal to indicate prior unauthorized removal of the container contents.

The opened container may be easily resealed by pressing the closure 34 into the position of FIG. 2. By the time the coffee reaches the consumer, the evolution of gas has either ceased or greatly subsided, so that upon subsequent reopening there is no appreciable outrush of gas. Thus the fact that the membrane 48 is no longer present is of no moment.

It is thought that the invention and many of its attendant advantages will be understood from the foregoing description, and it will be apparent that various changes may be made in the form, construction and arrangement of the parts and that changes may be made in the steps of the method described and their order of accomplishment without departing from the spirit and scope of the invention or sacrificing all of its material advantages, the form hereinbefore described being merely a preferred embodiment thereof.

I claim:

1. A coffee package comprising a container with gas generating ground coffee contained therein, said container having a body provided with an annular upstanding wall formed on the top thereof and defining a dispensing opening in said body, a gas permeable membrane disposed between said coffee and said opening, a cover for said opening, a flexible panel in said cover extending radially beyond said upstanding wall and terminating at its periphery in a downwardly and inwardly extending annular cover wall underlying a marginal portion of said cover panel and terminating inwardly in a vented cover locking portion that securely engages said upstanding body wall to retain said cover temporarily on said body, an annular vent sealing portion on said panel, an annular vent valve seat portion on said upstanding wall surrounding said dispensing opening and disposed in opposition to and normally cooperating with said vent sealing portion of the closure to prevent egress of gas from the container, said panel being adapted to bulge upwardly from its said periphery and away from said annular cover wall under pressure of the gas generated by said coffee to move said vent sealing portion out of contact with said vent seat portion of permit the escape of gas through said gas permeable membrane and from the container through said vented cover locking portion when a predetermined pressure is reached.

2. A coffee package comprising a container with gas generating ground coffee contained therein, said container including a body having its upper end formed with an upwardly extending annular wall defining a dispensing opening in said body, said wall teminating upwardly in an annular curl, and a closure for said opening, said closure including a normally substantially flat flexible panel carrying a sealing gasket adapted to seat upon said body curl, said panel projecting radially outwardly a substantial distance beyond said gasket and said curl and terminating outwardly in a downwardly and inwardly turned edge merging with an annular portion underlying the margin of said panel and terminating inwardly in a vented closure locking annular portion secured in temporary frictional locking engagement with said upwardly extending wall of said body member, said panel being adapted to bulge upwardly from the plane of said edge thereof under pressure of the gas generated by said coffee, the spacing of said gasket from the said panel amplifying the upward movement of the gasket and producing a reliable venting action past said gasket and through said vented cover portion at a low internal pressure.

3. The package of claim 2 wherein said annular portion underlying said panel is a reinforcing bead that terminates inwardly in a downwardly extending vented hollow curl which engages against said upwardly extending wall to retain said closure in place on said body.

4. The package of claim 3 wherein a gas permeable membrane is secured to said body in interposition between said coffee and said closure to permit the gases generated by said coffee to flow freely therethrough while restraining passage of said coffee.

5. A package containing a gas generating coffee product, said package comprising a container including a body having an upstanding ring member formed on its upper end defining and surrounding a dispensing opening formed in said body, and a closure for said opening, said closure including a normally substantially flat flexible panel carrying a sealing gasket adapted to seat upon said ring member, said panel projecting radially outwardly a substantial distance beyond said ring member and terminating outwardly in a downwardly and inwardly turned edge merging with an annular portion underlying the margin of said panel and terminating inwardly in temporary interrupted annular locking engagement with said ring member thus leaving venting spaces between said annular closure portion and said ring, whereby, under pressure of the gas generated by said product, said panel bulges upwardly from its said outer edge to its center so that the inward spacing of said gasket from said outer edge of the panel amplifies the upward movement of the gasket to produce a reliable venting action past said gasket and through said venting spaces at a low internal pressure.

6. A package containing a gas generating coffee product, said package comprising a container including a body having an annular upwardly extending wall formed on its top and defining a dispensing opening in said body, a closure for said opening, a flexible panel in said closure extending radially beyond said upstanding wall and terminating at its periphery in a downwardly and inwardly extending annular wall underlying a marginal portion of said panel and terminating inwardly in a vented closure locking portion that securely engages said upstanding body wall to reain said closure temporarily on said body, an annular vent sealing portion on said panel, an annular vent valve seat portion on said body wall surrounding said dispensing opening and disposed in opposition to and normally cooperating with said vent sealing portion of the closure to prevent egress of gas from the container, said panel being adapted to bulge upwardly from its said periphery and away from said annular cover wall under pressure of the gas generated by said product to move said vent sealing portion out of contact with said vent seat portion to permit the escape of gas through said valve and from the container through said vented cover locking portion when a predetermined pressure is reached.

References Cited in the file of this patent

UNITED STATES PATENTS

| | | |
|---|---|---|
| 1,728,533 | Fenn | Sept. 17, 1929 |
| 1,924,059 | Hoskins | Aug. 22, 1933 |
| 1,963,782 | Ford | June 19, 1934 |
| 2,024,511 | Darling | Dec. 17, 1935 |
| 2,130,637 | Darling | Sept. 20, 1938 |
| 2,174,437 | Collins | Sept. 26, 1939 |
| 2,298,545 | Waters | Oct. 13, 1942 |
| 2,361,344 | Yates | Oct. 24, 1944 |
| 2,368,561 | Moore | Jan. 30, 1945 |
| 2,429,984 | Berghind | Nov. 4, 1947 |
| 2,430,663 | Berhman | Nov. 11, 1947 |

FOREIGN PATENTS

| | | |
|---|---|---|
| 784,017 | Great Britain | Oct. 2, 1957 |